(12) United States Patent
Roussel

(10) Patent No.: US 8,828,164 B2
(45) Date of Patent: Sep. 9, 2014

(54) CHAMBER INCLUDING A SEALED CONNECTION ASSEMBLY SLIDING INSIDE A TRANSLATION PLANE

(75) Inventor: Eric Roussel, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 172 days.

(21) Appl. No.: 13/391,238

(22) PCT Filed: Aug. 4, 2010

(86) PCT No.: PCT/FR2010/051649
§ 371 (c)(1),
(2), (4) Date: Feb. 17, 2012

(87) PCT Pub. No.: WO2011/023877
PCT Pub. Date: Mar. 3, 2011

(65) Prior Publication Data
US 2012/0153574 A1 Jun. 21, 2012

(30) Foreign Application Priority Data

Aug. 24, 2009 (FR) ...................................... 09 55764

(51) Int. Cl.
| | |
|---|---|
| B32B 41/00 | (2006.01) |
| F16J 15/32 | (2006.01) |
| B29D 11/00 | (2006.01) |
| B29C 63/22 | (2006.01) |
| B29C 63/00 | (2006.01) |

(52) U.S. Cl.
CPC .......... *F16J 15/3252* (2013.01); *F16J 15/3276* (2013.01); *F16J 15/3224* (2013.01); *B29D 11/0073* (2013.01); *B29C 63/22* (2013.01); *B29C 63/0073* (2013.01)

USPC ............. 156/64; 156/350; 156/351; 156/367; 156/378; 156/379

(58) Field of Classification Search
CPC .. B29C 66/81455; B29C 65/00; B29C 63/16; G02F 2001/133354
USPC ....................... 156/64, 350, 351, 367, 378, 37
See application file for complete search history.

(56) References Cited

U.S. PATENT DOCUMENTS

| | | | |
|---|---|---|---|
| 4,242,162 A | 12/1980 | Ronning et al. | |
| 2007/0195422 A1* | 8/2007 | Begon et al. | ................... 359/642 |

(Continued)

FOREIGN PATENT DOCUMENTS

| | | |
|---|---|---|
| DE | 4107083 A1 | 9/1992 |
| DE | 9107907.1 | 10/1992 |
| FR | 2810095 A1 | 12/2001 |

(Continued)

OTHER PUBLICATIONS

EPM, Surface Finish, 2006, http://www.epm.com/surface_finish.htm.*

*Primary Examiner* — Katarzyna Wyrozebski Lee
*Assistant Examiner* — Joshel Rivera
(74) *Attorney, Agent, or Firm* — Seed IP Law Group PLLC

(57) ABSTRACT

A chamber includes a sealed connection assembly sliding inside a translation plane, having two rigid parts, one of which comprises a groove. A planar seal and at least one O-ring seal are positioned in the groove, with the O-ring seal under the planar seal. An active surface of the planar seal, which projects above the groove, is compressed against a planar bearing surface of the other rigid part. The chamber can be used in a device for applying a plastic film onto a spectacle lens, in order to move the lens inside a variable-pressure space.

8 Claims, 2 Drawing Sheets

(56) References Cited

U.S. PATENT DOCUMENTS

2008/0139074 A1* 6/2008 Choi et al. ............... 445/25
2008/0314499 A1 12/2008 Begon et al.
2010/0193112 A1 8/2010 Bovet et al.
2012/0002162 A1 1/2012 Allione et al.

FOREIGN PATENT DOCUMENTS

WO 2011/023879 A2 3/2011

* cited by examiner

CHAMBER INCLUDING A SEALED CONNECTION ASSEMBLY SLIDING INSIDE A TRANSLATION PLANE

The invention relates to a chamber with variable internal pressure, comprising a sealed connection assembly sliding inside a translation plane.

It also relates to a device for applying a plastic film onto a spectacle lens, which comprises such a chamber.

Certain devices require assembling two parts together in order to achieve two functions simultaneously: a first sealing function, in particular to form a seal for a gas or a gas mixture, and a second function of moving one of the parts relative to the other in any direction which is contained in a translation plane.

In addition, the desired assembly may be subject to at least some of the following requirements:

the seal must be efficient up to at least a differential gas pressure which is stated in the specifications;
the resistance of the assembly to the movement of the two parts relative to each other is not too high;
the assembly involves a low number of mechanical elements;
the mechanical elements used are simple and inexpensive to manufacture;
the assembly process consists of a low number of assembly steps;
the connection assembly has small dimensions which require little space; and
maintenance of the connection assembly after a period of use is as minimal as possible.

The invention proposes a chamber with variable internal pressure which satisfies at least some of these requirements, and others as well. For this purpose, the chamber comprises a sealed connection assembly sliding inside a translation plane, with this connection assembly comprising itself:

a first rigid part, which has an orifice and a first flat surface surrounding this orifice; and
a second rigid part, which has a second flat surface surrounding a central portion of this second part.

These first and second parts are arranged so that the central portion of the second part faces the orifice of the first part, with the first and second surfaces being parallel and facing one another. In the invention, one of the first and second surfaces comprises a groove surrounding the respective orifice or central portion to form a closed path, and the connection assembly additionally comprises:

a planar seal, which has a flat active surface in the form of a circular ring, and which is arranged in the groove so that the active surface of this planar seal is in continuous contact, along the closed path, with the flat surface, called "counter surface", of the other one of the first and second parts that is not the one comprising the groove;
at least a first O-ring seal, which is arranged between the planar seal and a bottom of the groove, with a depth of the groove being between a thickness of the first O-ring seal and a sum of this thickness of the first O-ring seal and a thickness of the planar seal;
a movement control system for controlling the displacement of the first and second parts relative to each other, along two axes parallel to the translation plane, this movement control system being adapted to produce a sliding of the active surface of the planar seal against the counter surface; and
a compression system for the first and second parts, which is arranged for compressing the planar seal against the counter surface, producing a compressive force for the planar seal through the first O-ring seal, perpendicular to the translation plane.

Thus, in accordance with one feature of the invention, two seals are superimposed in the groove and extend continuously around the orifice: the O-ring seal which is positioned first at the bottom of the groove, and the planar seal which is positioned above the O-ring seal and which is applied against the counter surface. The compression system produces force that compresses the planar seal against this counter surface. Because of the superposition of the two seals in the invention, the active surface of the planar seal can better conform to the micro-irregularities of the counter surface which are facing the groove, at a same compressive force. In other words, the ability of the planar seal to conform to and penetrate the irregularities of the counter surface is greater at a same compressive force. In the terminology of the art, the association of the two seals in the groove gives the planar seal greater compliance. Thus the compressive force, which is adjusted using the compression system, can be reduced while maintaining the same level of gas-tightness for the contact between the planar seal and the counter surface. The friction from the sliding resistance of the active surface of the planar seal against the counter surface is also decreased as a result, so that the two parts can be moved relative to each other and parallel to the translation plane without excessive force.

In addition, the O-ring seal ensures a seal between the planar seal and the bottom of the groove which is greater than the seal obtained by direct contact between the planar seal and the groove.

The mechanical elements used are as follows, in addition to the two rigid parts which are assembled together: two seals, a movement control system for planar two-axis movement, and a compression system. All these elements can be simple, as the friction and compressive force involved are low.

Lastly, the connection assembly is easy to assemble and requires minimal space. In particular, the movement control device and the compression device can be mechanical elements that are commercially available. They can also be implemented easily, given that the other elements of the connection assembly require little space.

When the movement control device is actuated, the central portion of the second part passes in front of the orifice of the first part, parallel to the opening of this orifice. Simultaneously, a differential pressure can be maintained between two gases which are present between the two parts, respectively internally to and externally to the closed path of the groove.

According to additional characteristics of the invention, the first rigid part forms at least a portion of a wall of the variable pressure chamber, and the second rigid part is connected to a holder which extends inside the chamber. The holder is therefore movable relative to the chamber, along directions of translation that are parallel to the translation plane, when the movement control system is actuated. The invention therefore allows the movement, inside the chamber and from the outside, of an element or tool which is supported by the holder.

Various preferred embodiments of the invention may use some of the following improvements, separately or in combination:

at least one among the active surface of the planar seal and the counter surface may be coated with a lubricant;
the connection assembly may additionally comprise a second O-ring seal which is arranged between the planar seal and the bottom of the groove and is concentric with the first O-ring seal, said second O-ring seal having a thickness identical to that of the first O-ring seal, so that the first and second O-ring seals are compressed simultaneously between the planar seal and the bottom of the groove;

the counter surface may have an average roughness Ra which is less than 3.2 µm, and preferably less than 0.8 µm;

the compression system may comprise at least one screw which is engaged in at least one portion rigidly connected to the first or the second part, and which is arranged to adjust the compressive force onto the planar seal; and the central portion of the second part may comprise a projecting portion which is narrower than the orifice of the first part, and which is inserted into the orifice with free space around this projecting portion, inside a peripheral edge of the orifice.

For an ophthalmic application, the holder may comprise a fastening head which is adapted to hold a spectacle lens firmly in place within the chamber. It may also comprise an axial displacement system adapted to additionally move the fastening head parallel to an axis which traverses the translation plane, and to additionally rotate the fastening head around this axis. Such a holder enables the translational movement of the spectacle lens along all three spatial directions inside the chamber, and rotating it around the axis, by controlling all these movements and rotations of the lens from outside the chamber.

Lastly, the invention also proposes a device for applying a plastic film onto a spectacle lens, said device comprising a chamber with variable internal pressure as described above, with side walls, a lower wall, and an upper wall. The first rigid part forms at least a portion of the lower wall and the upper wall has an opening. The device then additionally comprises:

an attachment system for attaching the film around the opening in the upper wall of the chamber; and a system for varying and controlling the pressure in the chamber.

The attachment system is adapted to hold a peripheral edge of the film firmly, so that the film closes off and seals the chamber. The film held in this manner is therefore reshaped where it crosses the opening in the upper wall, in a deformation which varies according to the pressure. In addition, the movement control system allows moving a reference point of the spectacle lens relative to a reference point of the plastic film, parallel to the translation plane, to bring the reference point of the spectacle lens in alignment with the reference point of the plastic film.

Other features and advantages of the invention will be apparent from the following description of a non-limiting example, with reference to the attached drawings in which.

For clarity, the dimensions of the elements represented in these figures do not correspond to the actual dimensions or actual relative dimensions. In addition, the same references are used in the two figures to denote the same elements.

Below, for illustrative purposes, the invention is described as part of a device for applying a portion of a plastic film 300 onto a spectacle lens 400. The following references are used for the elements indicated below:

300: the plastic film,
400: the spectacle lens,
100: a side wall of a variable pressure chamber,
101: an upper wall of the chamber, with an opening $O_{101}$,
1: a lower wall of the chamber, which constitutes the first rigid part of a connection assembly according to the invention,
2: a movable part which constitutes the second rigid part of the connection assembly according to the invention, and which can be moved in directions transverse to the chamber, and
200: a system for varying and controlling the pressure in the chamber.

Figure 1:
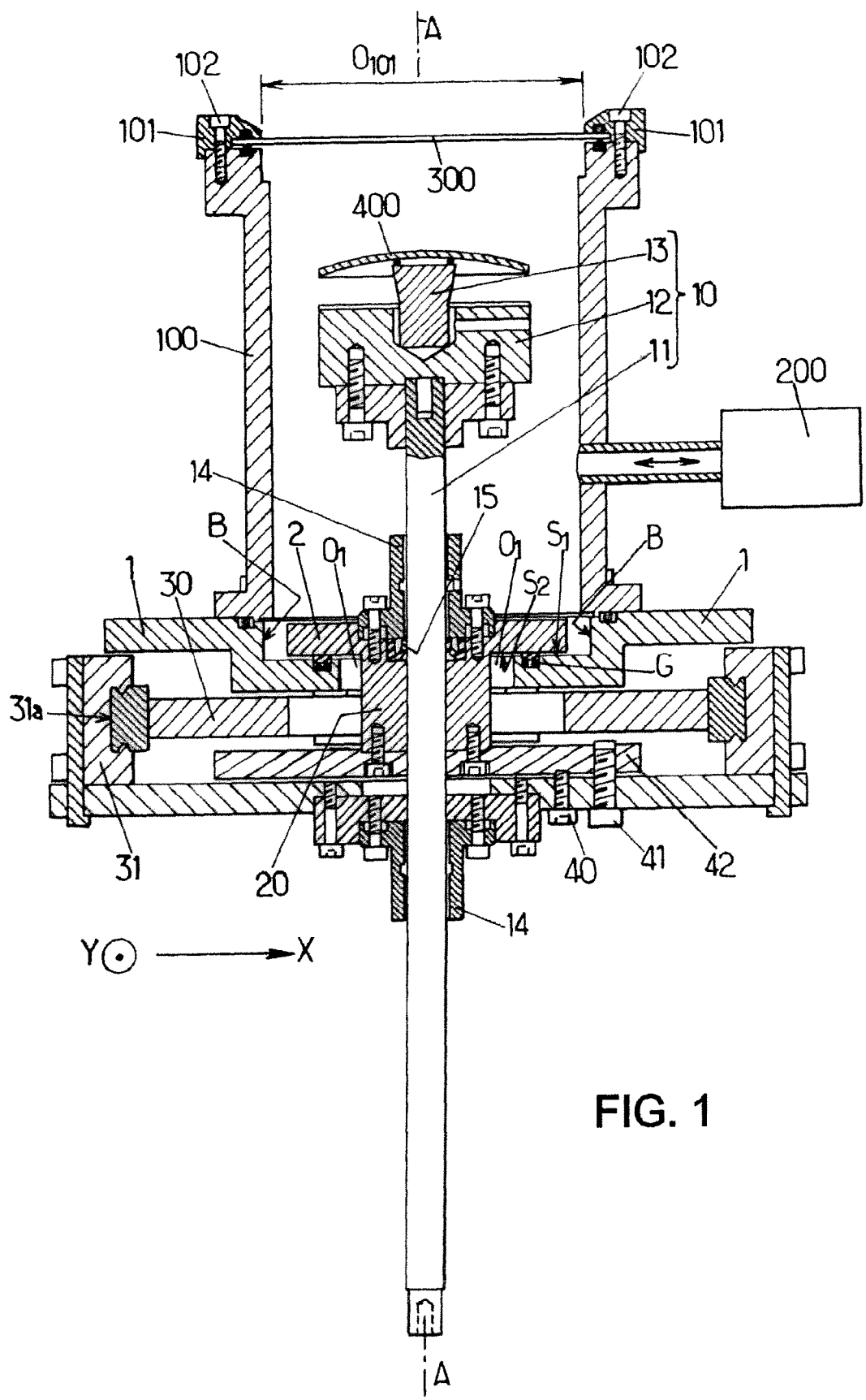
FIG. 1 is a cross-sectional view of a device using the invention.

In the device illustrated in FIG. 1, the upper wall 101 forms a ring around the opening $O_{101}$. It can be firmly fastened, for example by means of several screws 102, to the upper edge of the side wall 100. When the peripheral edge of the portion of plastic film 300 is inserted between the walls 100 and 101, the screws 102 form an attachment system that attaches the film 300 around the opening $O_{101}$. The film 300 then seals off the variable pressure chamber.

The system 200 for varying and controlling the pressure in the chamber is not represented in detail, as a person skilled in the art is familiar with such systems. The film 300, which is held in place by the attachment system, is reshaped where it crosses the opening $O_{101}$ in a deformation which varies with the pressure produced by the system 200.

The lower wall 1 has an orifice $O_1$, which may be centered relative to a longitudinal axis of the chamber denoted A-A.

The movable part 2 closes the orifice $O_1$. In addition, it has a projecting portion 20 which extends through the orifice $O_1$, and is narrower than a peripheral edge B of this orifice in all directions parallel to the lower wall 1. In this manner, the projecting portion 20 is compatible with the displacements of the movable part 2 in these directions. The projecting portion 20 serves both to cause the movable part 2 to move and to support a holder which extends inside the chamber.

Figure 2:
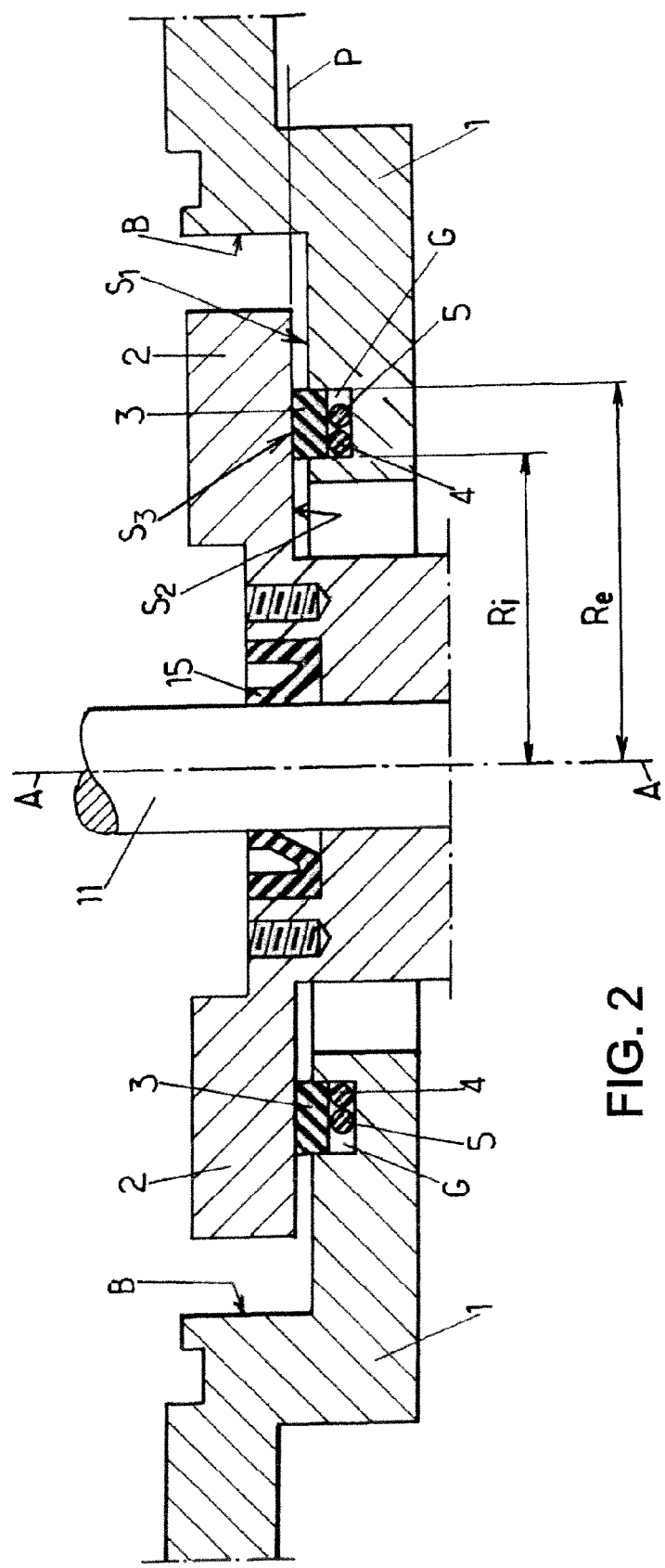
FIG. 2 is an enlarged view of a portion of FIG. 1, containing an implementation of the invention.

The lower wall 1 and the movable part 2 respectively have flat surfaces which are parallel and face each other, denoted $S_1$ and $S_2$. The surface $S_1$ of the lower wall 1 has a groove G that may be of a rectangular cross-section. The groove G surrounds the orifice $O_1$ at a distance from it. Advantageously, the groove G and the orifice $O_1$ may be circular and concentric to the axis A-A. Several annular seals are arranged in the groove G as follows, and as illustrated in more detail in FIG. 2:

a first O-ring seal 4, which is placed at the bottom of the groove G, preferably against the side of the groove G which is closest to the axis A-A, optionally, a second O-ring seal 5, which is also placed at the bottom of the groove G, surrounding the first O-ring seal 4 relative to the axis A-A; and a planar seal 3, which is placed in the groove G on the O-ring seal 4, and also on the O-ring seal 5 when the latter is present.

The planar seal 3 has an active surface $S_3$ which is flat and in the shape of a circular ring. It preferably has a rectangular cross section. The depth of the groove G is adapted to the thicknesses of the seals 3 and 4, so that the planar seal 3 is embedded in the groove G for a portion of its thickness, while its active surface $S_3$ protrudes relative to the surface $S_1$ of the lower wall 1. The active surface $S_3$ is parallel to the surface $S_2$ of the movable part 2, to establish a sliding sealing connection with the latter. For this reason, the surface $S_2$ is called the counter surface. During use, the lower wall 1, the O-ring seal(s) 4 (and 5), the planar seal 3, and the movable part 2 are compressed along the longitudinal axis A-A. In addition, when the O-ring seal 5 is used together with the O-ring seal 4, they are identical in thickness so that the active surface $S_3$ of the planar seal 3 is still parallel to the counter surface $S_2$.

For example, when the counter surface $S_2$ is of stainless steel, the planar seal 3 may be of polytetrafluoroethylene (PTFE) with a thickness measured parallel to the axis A-A that is equal to 3 mm, an internal radius $R_i$ equal to 30 mm, and an external radius $R_3$ equal to 35 mm. The O-ring seal 4, and the O-ring seal 5 when the latter is used, may be seals of Viton®, EPDM®, or nitrile, with a same cross-section diameter of 1.78 mm.

Preferably, the active surface $S_3$ of the planar seal 3 and the counter surface $S_2$ of the movable part 2 can be coated with a lubricant which reduces friction between these two surfaces when the movable part 2 moves. This lubricant may be silicon grease, also called plumbers grease, or may be synthetic grease, such as a mixture of mineral oil and lithium hydroxystearate soap for example. It may also contribute to the seal established by the connection between the lower wall 1 and the movable part 2.

The counter surface $S_2$ preferably has a low roughness. A person skilled in the art is aware of the methods for treating a surface to reduce its roughness, and it is unnecessary to list them here. Advantageously, the counter surface $S_2$ has an average roughness Ra, which is the arithmetic average of the roughness profile, of less than 3.2 μm, for example equal to 0.7 μm. The average roughness Ra is the mean of the absolute heights of the peaks and valleys detected on the surface $S_2$, these heights being measured relative to the midplane of the surface. Such a measurement of the average roughness Ra can be done statistically on a sample of the surface using a surface roughness-meter, in accordance with ISO 4287.

A system for controlling the movement of the movable part 2 comprises an assembly of rectilinear rails oriented in the direction of two axes X and Y which are parallel to the counter surface $S_2$ and preferably perpendicular to each other. The movable part 2, when it is assembled with these rails, forms a small traveling table which moves along two axes, the fixed portion being connected to the lower wall 1. The reference 30 denotes the portions of the movement control system which are movable only along the X axis, and the reference 31 indicates the portions of the system which are movable along the Y axis relative to the portions 30. The reference 31a indicates the rails which enable displacements parallel to the Y axis. The rails for displacements parallel to the X axis are not visible in FIG. 1, as they are positioned in front of and in back of the plane shown in this figure. Similarly, the micrometer screws for controlling the lengths of the displacements along the X and Y axes are not represented. Such a movement control system is known, and it is unnecessary to describe it here in any further detail.

The movable part 2 is connected to the movable portion 31 by its projecting portion 20, so that it can be moved translationally in any directions which are parallel to the plane of the counter surface $S_2$ and which are combinations of two translational components along the X and Y axes. For this reason, the plane of the counter surface $S_2$ is called the translation plane of the connection assembly, and is denoted P in FIG. 2.

For example, the movable part 2 can be connected to the movable portion 31 by pairs of screws 40 and 41, which allow adjusting the space between the surface $S_1$ of the lower wall 1 and the counter surface $S_2$ of the movable part 2. In this manner it is possible to bring the active surface $S_3$ of the planar seal 3 against the counter surface $S_2$ in a precise manner. The planar seal 3 thus forms a gas-tight seal between the interior and exterior of the chamber, which can be efficient up to differential pressures of greater than 3 bar, or even greater than 6 bar. In the embodiment illustrated in FIG. 1, the movable portion 31 is connected to the projecting portion 20 of the movable part 2 by an intermediate rigid part 42. In other embodiments, this intermediate part may be elastic, meaning it can act as a spring, for adjusting the compressive force of the planar seal 3 against the lower wall 1. Alternatively, spring elements may be used at the ends of the screws 40 and/or 41, for more precise adjustment of the compressive force of the seal 3 against the counter surface $S_2$.

For the ophthalmic application considered here, the projecting portion 20 of the movable part 2 may support a holder 10 which can hold an ophthalmic lens rigidly in place in the chamber. Such a holder 10 may comprise a shaft 11 which passes through the projecting portion 20, and which has a base 12 at its end inside the chamber. A fastening head 13, which is adapted to hold the spectacle lens 400 firmly, is attached to the base 12. In an improvement of the device, the shaft 11 can slide parallel to the axis A-A through the projecting portion 20, and can rotate around an axis linked to the movable part 2 and parallel to the axis A-A. To this purpose, the projecting portion 20 may be fitted with guides 14 and a seal 15, which may be a gasket ring with an inner lip or a radial shaft seal.

Usually, the plastic film 300 comprises a useful portion which is predetermined, and which exactly corresponds to the shape of the spectacle lens 400. In other words, the useful portion of the film 300 and the lens 400 have respective peripheral edges which are chosen to coincide when the film is applied onto the lens. It is therefore necessary to align the lens 400 precisely relative to the useful portion of the film 300, parallel to the axis A-A, once the film has been attached to the chamber.

The movement control system for the movable part 2 allows displacing the spectacle lens 400 relative to the film 300, parallel to the translation plane P. In this manner, the spectacle lens can be brought to an exact alignment with the film. When the holder 10 is itself movable relative to the part 2 as described above, it can be rotated to orient the lens 400 in accordance with the orientation of the film 300 on the chamber. To do this, positional marks or a pattern printed on the film 300 and a system for detecting the position of the lens 400 relative to the film may be used. The spectacle lens can thus be brought to a position under the plastic film, exactly aligned with the useful portion of the latter and with the same orientation.

The film 300 can then be preshaped by varying the pressure inside the chamber. For example, an outward curvature of the film 300 relative to the chamber can be obtained by ordering the system 200 to increase the pressure. The seals 3 and 4 ensure that no gas can leak, so that the curvature assumed by the film 300 during this preshaping step can be precisely adjusted to the shape of the face of the lens 400 onto which the film is to be applied.

The spectacle lens 400 is then pressed against the plastic film 300 by driving the shaft 11 further into the chamber, the lens pushing the film outward from the chamber. Additional movements for applying the film onto the lens may possibly be combined with the driving of the shaft 11 further into the chamber.

It is understood that many modifications and adaptations can be introduced into the embodiment of the invention described above. In particular, the groove G and the seals 3, 4 and possibly 5 may be carried by the movable part 2. The surface $S_1$ of the rigid part 1, which comprises the orifice $O_1$, then constitutes the counter surface.

It is also understood that a chamber with variable internal pressure, fitted with the sliding sealed connection assembly of the invention, may be used for applications other than the one detailed above, and in particular in technical fields besides ophthalmic applications. The dimensions and materials described may also be modified according to the desired application.

The invention claimed is:

1. A chamber with variable internal pressure, comprising:
a sealed connection assembly configured to slide inside a translation plane, said connection assembly including:
a rigid first part having an orifice and a flat first surface surrounding said orifice; and
a rigid second part having a flat second surface surrounding a central portion of said second part; the first and second parts being arranged so that the central portion of the second part faces the orifice of the first part, with the first and second surfaces being parallel and facing one another, one of the first and second surfaces including a groove surrounding the respective orifice or central portion to form a closed path;
a planar seal with a flat active surface, the planar seal being circular ring-shaped and arranged in the groove so that the active surface of said planar seal is in continuous contact, along the closed path, with the flat surface of the other one of the first and second parts that is not the one including the groove, called the counter surface;
at least a first O-ring seal arranged between the planar seal and a bottom of the groove, a depth of the groove being between a thickness of the first O-ring seal and a sum of said thickness of the first O-ring seal and a thickness of the planar seal;
a movement control system configured to control displacement of the first and second parts relative to each other, along two axes parallel to the translation plane, and to produce a sliding of the active surface of the planar seal against the counter surface; and
a compression system for the first and second parts, arranged to compress the planar seal against the counter surface, producing a compressive force for said planar seal through the first O-ring seal, perpendicular to the translation plane,
wherein said first part forms at least a portion of a wall of said chamber, and the second part is connected to a holder extending inside said chamber, so that said holder is movable relative to the chamber, along directions of translation that are parallel to said translation plane, when the movement control system is actuated.

2. The chamber according to claim 1, wherein at least one among the active surface of the planar seal and the counter surface is coated with a lubricant.

3. The chamber according to claim 1, additionally comprising a second O-ring seal arranged between the planar seal and the bottom of the groove and concentric with the first O-ring seal, said second O-ring seal having a thickness identical to the thickness of the first O-ring seal, so that the first and second O-ring seals are compressed simultaneously between said planar seal and said bottom of the groove.

4. The chamber according to claim 1, wherein the counter surface has an average roughness of less than 3.2 μm.

5. The chamber according to claim 1, wherein the compression system comprises at least one screw engaged in at least one portion rigidly connected to one of the first or second parts, and arranged to adjust the compressive force onto the planar seal.

6. The chamber according to claim 1, wherein the central portion of the second part comprises a projecting portion which is narrower than the orifice of the first part, and which is positioned in said orifice with free space around said projecting portion, inside a peripheral edge of the orifice.

7. The chamber according to claim 1, wherein the holder comprises:
a fastening head adapted to hold a spectacle lens firmly in place within the chamber, and
an axial displacement system adapted to additionally move the fastening head parallel to an axis which traverses the translation plane, and to additionally rotate said fastening head around said axis.

8. A device for applying a plastic film onto a spectacle lens, comprising:
a chamber with variable internal pressure according to claim 1, the chamber including side walls, a lower wall, and an upper wall, the first rigid part forming at least a portion of the lower wall and the upper wall having an opening;
an attachment system configured to attach the film around the opening in the upper wall, and hold a peripheral edge of the film firmly in place so that said film closes off and seals the chamber; and
a system configured to vary and control the pressure in the chamber, the film held by the attachment system therefore being reshaped where it crosses the opening in the upper wall in a deformation which varies according to the pressure;
wherein the movement control system allows moving a reference point of said spectacle lens relative to a reference point of the plastic film, parallel to the translation plane, to bring the reference point of the spectacle lens in alignment with the reference point of the plastic film.

* * * * *